Figure 5:
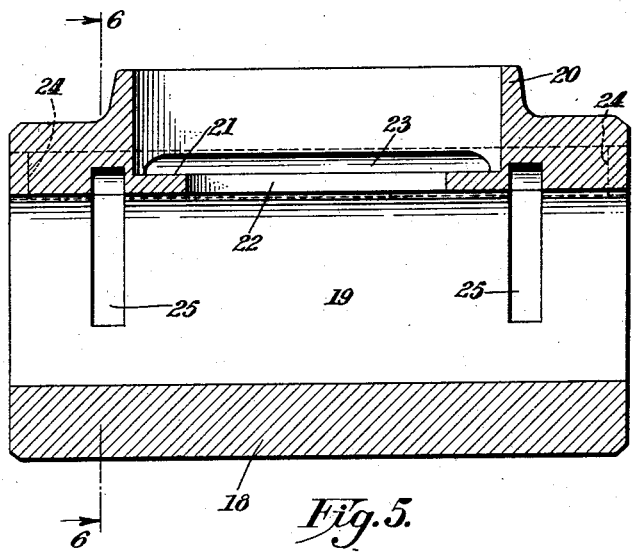

June 9, 1931.  E. TRAUB  1,809,649
LUBRICATING MEANS FOR BEARING SURFACES
Filed Dec. 28, 1928   2 Sheets-Sheet 1
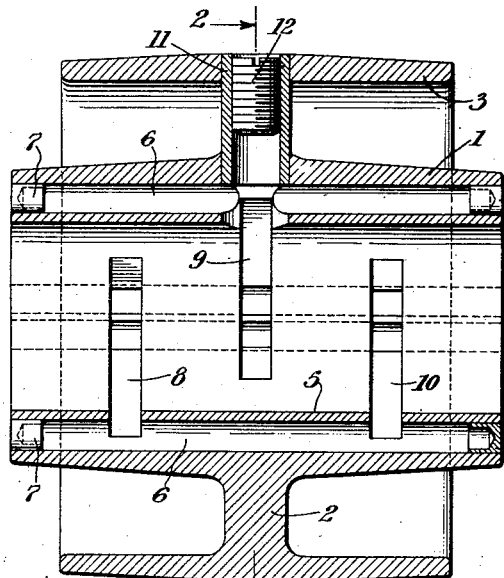
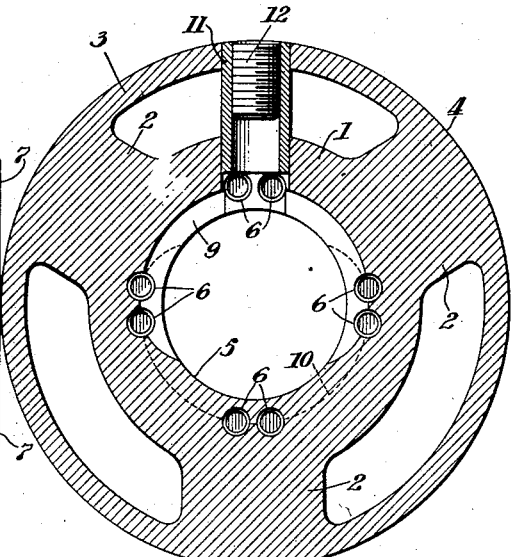
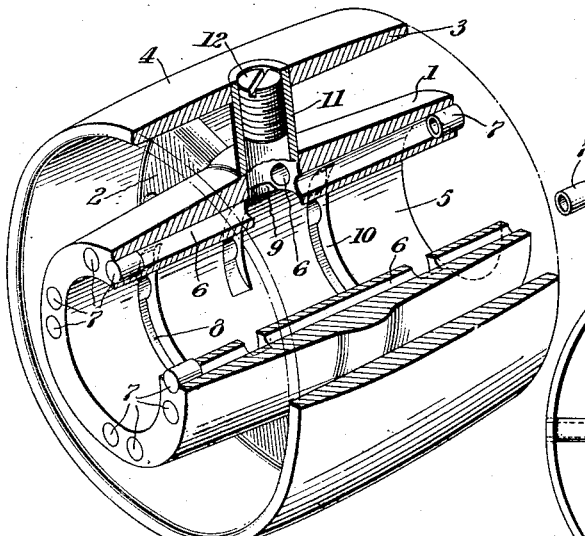
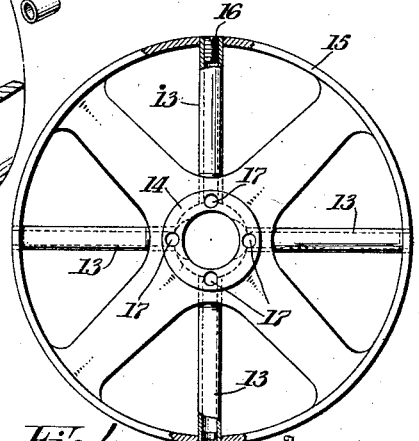
Inventor
Emil Traub
By Henry J Miller
Attorney June 9, 1931.                 E. TRAUB                    1,809,649
              LUBRICATING MEANS FOR BEARING SURFACES
                    Filed Dec. 28, 1928      2 Sheets-Sheet 2

Inventor
Emil Traub

Patented June 9, 1931

1,809,649

UNITED STATES PATENT OFFICE

EMIL TRAUB, OF NEWARK, NEW JERSEY, ASSIGNOR TO THE SINGER MANUFACTURING COMPANY, OF ELIZABETH, NEW JERSEY, A CORPORATION OF NEW JERSEY

LUBRICATING MEANS FOR BEARING SURFACES

Application filed December 28, 1928. Serial No. 328,943.

This invention relates to improvements in devices for lubricating the bearing surfaces of relatively rotatable members and has for its object to increase the efficiency of the so-termed "self-lubricators" heretofore employed for this purpose.

In one embodiment of the invention, the hub of a loose-pulley is provided, adjacent its bearing surface, with a plurality of substantially parallel, tubular bores extending lengthwise of the hub and closed at their opposite ends to provide lubricant chambers. Intersecting different groups of said chambers are a plurality of segmental grooves provided in the bearing surface of the pulley hub, each of said grooves extending at least one half of the circumference of and terminating at their opposite ends in said bearing surface. Extending radially from the pulley face, substantially centrally of its width, is a supply-duct, preferably comprising a tube leading to one or more of the chambers at the point of intersection of a segmental-groove with a chamber. This tube is internally threaded at its outer end to receive a removable sealing plug.

Any lubricant inserted through the supply-duct is therefore free to pass directly to the bearing surface of the pulley-hub, being spread circumferentially of the bearing surface by the segmental-groove which intersects the supply-duct. The lubricant is also free to enter the chambers which intersect the supply-duct and the surplus lubricant seeps along the bearing surface lengthwise thereof. The remaining segmental-grooves collect this seepage, thereby causing the lubricant to enter the respective groups of chambers intersected by the different segmental-grooves. As the several segmental-grooves together encompass the bearing surface, it is evident that lubricant will be supplied to the bearing surface and collected by the segmental-grooves in any stopping position of the pulley.

The described principle of spreading the lubricant may also be applied to the stationary bearing surface for a rotatable member. In one embodiment of this application of the present improvement, a bearing-box for a shaft is provided upon its upper side with an open reservoir of which the base is provided with a slot extending longitudinally thereof and opening to the shaft journaled in the bearing-box. Disposed upon opposite sides of said slot and extending lengthwise of the bearing-box are the segmental portions of tubular chambers, the upper portions of which are cut away within the reservoir to constitute a part of the reservoir base. Intersecting the tubular chambers adjacent the opposite ends thereof beyond the base slot of the reservoir are the lubricant-spreading segmental-grooves formed in the bearing surface of the box.

Figure 6:
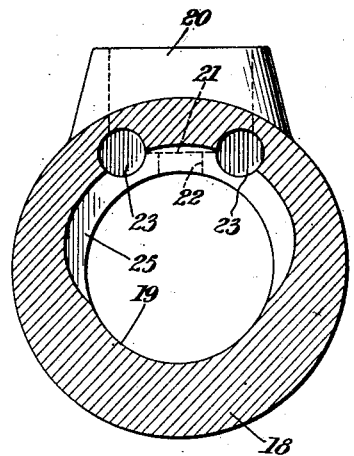
Figure 7:
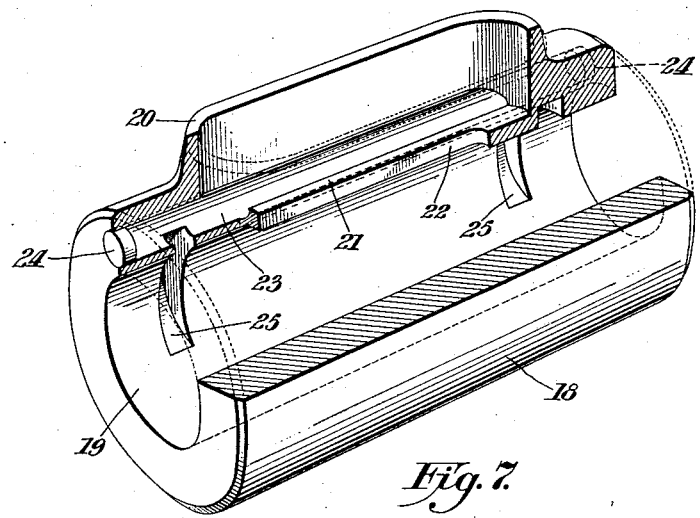

In the accompanying drawings, Fig. 1 is a central, longitudinal section of a pulley having the improved lubricating means. Fig. 2 is a sectional view of the pulley substantially on the line 2—2 of Fig. 1. Fig. 3 is a perspective view, partly in section, of the pulley. Fig. 4 is an end view, partly in section, of a modification of the pulley lubricating means. Fig. 5 is a central longitudinal section of a bearing-box having the improved lubricant-spreading means. Fig. 6 is a sectional view of the bearing-box substantially on the line 6—6 of Fig. 5. Fig. 7 is a perspective view, partly in section, of the bearing-box.

In Figs. 1 to 3 of the drawings is illustrated a pulley having, as usual, a hub 1 from which project the spaced arms or spokes 2, supporting the rim 3 having the belt-face 4. The inner face of the hub 1 constitutes a cylindrical bearing surface 5, which may be journaled upon a shaft or other member (not shown).

In order to lubricate the bearing surface 5 of the pulley, the present improvement comprehends the provision of a plurality of chambers in the pulley-hub, which chambers preferably comprise tubular bores, as 6, extending lengthwise of the hub 1 adjacent to the bearing surface 5. The bores or chambers 6 are preferably arranged in pairs and in parallel relationship, the outer ends of the chambers being sealed by suitable plugs, as 7. In the present instance, four pairs of chambers 6 are provided, which pairs of chambers are equally spaced circumferentially of the hub.

Intersecting different groups of the chambers substantially diametrically thereof are a plurality of segmental-grooves, as 8, 9 and 10 provided in the bearing surface 5, which grooves extend in directions circumferentially of the hub and terminate at their opposite ends in said bearing surface. The length of each of the grooves is preferably such as to be at least equal to one half of the circumference of the bearing surface 5, whereby each of the grooves intersects at least three of the pairs of chambers 6, adjacent grooves terminating at different points in a direction circumferentially of the bearing surface and therefore intersecting different groups of chambers 6.

Extending radially from the belt-face 4 of the pulley and substantially centrally of the belt-face width is a lubricant supply-duct comprising a tube 11, which is internally threaded at its outer end to receive a removable sealing plug 12. The inner end of the tube opens into a pair of chambers 6 at the point of intersection of said pair of chambers by the segmental-groove 9.

As above indicated, the lubricant supplied through the tube or duct 11 is free to enter the groove 9 and is conducted thereby circumferentially of the bearing surface, said lubricant being, of course, also free to enter the pair of chambers 6 intersected by the duct 11. As the lubricant seeps along the bearing surface 5 it is collected by the grooves 8 and 10 and by them conducted to others of the chambers 6. After the pulley has been supplied with the proper quantity of lubricant, the duct 11 is again sealed by means of the plug 12.

Because of the described arrangement of the segmental-grooves 8, 9 and 10, it is evident that in any stopping position of the pulley at least one segmental-groove will occupy a position such as to cause distribution of the lubricant upon the bearing surface 5 and that a surplus of the lubricant is collected by others of the grooves.

In Fig. 4 of the drawings is illustrated a modification of the described lubricating arrangement. This modification shows that a plurality of radial tubes as 13, may be employed, which tubes 13 extend from the belt-face into suitable apertures in the hub 14 of a pulley 15. The tubes 13 are preferably equally spaced circumferentially of the pulley, thereby obtaining a more perfect balance, as well as an increased lubricant supply. In this case, it may be desired to employ only one of the tubes as a supply-duct, by providing only one of said tubes with a removable plug 16, the others being permanently sealed at their outer ends. It is evident, however, that others or all of said tubes might have a removable plug. Fig. 4 likewise illustrates chambers 17 arranged singly, instead of in pairs, each chamber being intersected by one of the tubes 13.

In Figs. 5 and 7 of the drawings is illustrated a bearing-box 18 having a bearing surface 19 for a shaft or like rotatable member (not shown). Upon its upper side, the bearing-box is provided with an upwardly directed flange 20 having the general contour of a flattened ellipse to form an open-top reservoir. The base 21 of the reservoir is provided with a slot 22 extending lengthwise thereof and opening directly to the bearing surface 19 of the box 18. Extending lengthwise of the bearing-box upon opposite sides of the slot 22 are tubular bores, as 23, which are closed at their outer ends by plugs, as 24. The upper portions of the tubular bores are cut away within the reservoir, the remaining segmental portions of said bores constituting part of the reservoir base.

Intersecting the tubular bores 23 adjacent the opposite ends thereof beyond the reservoir are segmental-grooves, as 25, provided in the bearing surface 19. The grooves 25 terminate at their opposite ends in the bearing surface 19 and constitute means, additional to the slot 22, for conducting lubricant from the reservoir to the bearing surface, thereby efficiently lubricating said bearing surface throughout the length and circumferentially thereof.

It is obvious that, if desired, lubricant absorbent wicking might be introduced into the chambers 6 or 23 and also into the grooves 8, 9, 10 and 25 to control the flow of the lubricant to the respective bearing surfaces.

Having thus set forth the nature of the invention, what I claim herein is:

1. A rotatable member having a hub defining a bearing surface, said hub being provided with a plurality of lubricant-chambers spaced circumferentially of and extending lengthwise of the hub, said hub having in its bearing surface a plurality of segmental-grooves each intersecting less than the whole number of said chambers, and means for supplying lubricant to one of said chambers.

2. A rotatable member having a hub defining a bearing surface, said hub being provided with a plurality of pairs of lubricant-chambers spaced circumferentially and extending lengthwise of the hub adjacent to said bearing surface, said hub having in its bearing surface a plurality of segmental-grooves extending circumferentially of the hub, each of said grooves intersecting a pair of said chambers substantially diametrically thereof.

3. A rotatable member having a hub defining a bearing surface, said hub being provided with a plurality of lubricant-chambers spaced circumferentially and extending lengthwise of the hub adjacent said bearing surface, the hub having in its bearing surface a plurality of segmental-grooves intersecting less than the whole number of said chambers, each of said segmental-grooves extending at least throughout one half the circumference of the hub bearing surface.

4. A rotatable member having a hub defining a bearing surface, said hub being provided with a plurality of lubricant-chambers spaced circumferentially and extending lengthwise of the hub adjacent said bearing surface, the hub having in its bearing surface a plurality of segmental-grooves intersecting less than the whole number of said chambers, adjacent grooves intersecting different groups of said chambers.

5. A rotatable member having a hub defining a bearing surface, said hub being provided with a plurality of lubricant-chambers disposed adjacent its bearing surface and spaced circumferentially of the hub, the hub having in its bearing surface a plurality of segmental-grooves each intersecting a plurality of said chambers, said member having a substantially radially disposed supply-duct communicating with one of said chambers, and a removable sealing plug for said supply-duct.

6. A rotatable member having a hub defining a bearing surface, said hub being provided with a plurality of pairs of lubricant-chambers disposed adjacent its bearing surface and spaced circumferentially of the hub, the hub having in its bearing surface a plurality of segmental-grooves each intersecting a pair of said chambers, said member having a substantially radially disposed supply-duct communicating with a pair of said chambers at the point of intersection of one of said segmental-grooves therewith.

7. A rotatable member having a hub defining a bearing surface, said hub being proing provided with a plurality of lubricant-chambers spaced circumferentially and extending lengthwise of the hub adjacent to said bearing surface, the hub having in its bearing surface a plurality of segmental-grooves directed circumferentially of the bearing surface, each of said grooves intersecting a lubricant-chamber, said member having a plurality of substantially radially disposed supply-ducts each communicating at its inner end with a chamber, the ducts being equally spaced circumferentially of the member, and means for sealing the outer ends of said ducts.

In testimony whereof, I have signed my name to this specification.

EMIL TRAUB.